US008522645B2

(12) United States Patent
Uemura et al.

(10) Patent No.: US 8,522,645 B2
(45) Date of Patent: Sep. 3, 2013

(54) BLADE MEMBER, AND EDGE WORKING APPARATUS FOR THE BLADE MEMBER

(75) Inventors: Kensuke Uemura, Tsubame (JP); Hiroshi Ohtsubo, Seki (JP)

(73) Assignees: Nagata Seiki Co., Ltd., Tokyo (JP); Kai R&D Center Co., Ltd., Gifu-ken (JP)

( * ) Notice: Subject to any disclaimer, the term of this patent is extended or adjusted under 35 U.S.C. 154(b) by 526 days.

(21) Appl. No.: 12/734,644

(22) PCT Filed: Dec. 24, 2008

(86) PCT No.: PCT/JP2008/073494
§ 371 (c)(1), (2), (4) Date: May 13, 2010

(87) PCT Pub. No.: WO2009/084552
PCT Pub. Date: Jul. 9, 2009

(65) Prior Publication Data

US 2010/0288097 A1 Nov. 18, 2010

(30) Foreign Application Priority Data

Dec. 27, 2007 (JP) ................................ 2007-337779

(51) Int. Cl.
*B23K 15/06* (2006.01)
*B26B 9/00* (2006.01)

(52) U.S. Cl.
USPC .................... 76/104.1; 30/346.53; 30/346.54; 30/346.55

(58) Field of Classification Search
USPC .............. 30/346.54, 346, 53, 346.53, 346.55; 76/104.1
See application file for complete search history.

(56) References Cited

U.S. PATENT DOCUMENTS

| | | | | |
|---|---|---|---|---|
| 3,911,579 | A * | 10/1975 | Lane et al. | 30/346.54 |
| 5,032,243 | A | 7/1991 | Bache et al. | |
| 2004/0099120 | A1 * | 5/2004 | Yamada et al. | 83/835 |
| 2006/0201001 | A1 * | 9/2006 | Teeuw et al. | 30/346.54 |

FOREIGN PATENT DOCUMENTS

| | | |
|---|---|---|
| GB | 1 380 583 | 1/1975 |
| JP | B2-54-28379 | 9/1979 |
| JP | A-01-109643 | 4/1989 |
| JP | A-03-171630 | 7/1991 |
| JP | 4321223 | * 11/1992 |
| JP | B2-2779453 | 5/1998 |
| JP | A-11-191208 | 7/1999 |

(Continued)

OTHER PUBLICATIONS

International Preliminary Report on Patentability mailed on Aug. 10, 2010 for the corresponding International patent application No. PCT/JP2008/073494 (English translation enclosed).

(Continued)

*Primary Examiner* — Stephen Choi
(74) *Attorney, Agent, or Firm* — Posz Law Group, PLC

(57) ABSTRACT

In a vacuum chamber, the edge of each blade group is subjected to an ion beam treatment under predetermined conditions using a plasma ion gun and argon as a medium, and is subjected to a plasma ion implantation of nitrogen plasma under predetermined conditions using a plasma ion implantation gun. As a result, it is possible to provide a blade member having an edge of a cutting quality enhanced by increasing the sharpness, a blade member having an edge of a rigidity enhanced by increasing the hardness, and a working apparatus capable of working those edges efficiently.

4 Claims, 3 Drawing Sheets

(56) References Cited

FOREIGN PATENT DOCUMENTS

| | | | |
|---|---|---|---|
| JP | A-2007-61212 | | 3/2007 |
| JP | A-2007-307673 | | 11/2007 |
| WO | WO 90/03455 | | 4/1990 |
| WO | WO 2007/116522 | A1 | 10/2007 |

OTHER PUBLICATIONS

International Search Report mailed on Mar. 17, 2009 for the corresponding International patent application No. PCT/JP2008/073494 (English translation enclosed).

* cited by examiner

BLADE MEMBER, AND EDGE WORKING APPARATUS FOR THE BLADE MEMBER

CROSS REFERENCE TO RELATED APPLICATIONS

This application is a U.S. national stage application of PCT/JP2008/073494 filed on Dec. 24, 2008, and claims priority to, and incorporates by reference, Japanese Patent Application No. 2007-337779 filed on Dec. 27, 2007.

FIELD OF THE INVENTION

The present invention relates to a blade member used, for example, in a razor, and an apparatus for working the edge of the blade member.

BACKGROUND OF THE INVENTION

Conventionally, the edge of this type of blade member is worked with a razor strop to remove burrs. This reduces the sharpness of the edge and degrades the cutting quality. Also, the hardness and rigidity of the edge are reduced.

Patent Document 1: Japanese Examined Patent Publication No. 54-28379

Patent Document 2: Japanese Laid-Open Patent Publication No. 2007-61212

DISCLOSURE OF THE INVENTION

According to the technique disclosed in Patent Document 1, a cutting blade is subjected to ion implantation to improve the hardness. According to the technique disclosed in Patent Document 2, an edge is subjected to reactive-ion etching to increase the sharpness.

Accordingly, it is an objective of the present invention to provide a blade member having a superior edge by improving the processing techniques of ion beam treatment and plasma ion implantation, and a working apparatus capable of efficiently working such edges.

In accordance with a first aspect of the present invention, a blade member is provided in which edges of a group of blades are subjected to ion beam treatment using a plasma ion gun in a vacuum chamber, in which argon is used as a medium. The pressure of the argon gas is 0.1 to 1 Pa, a bias voltage applied to the blade group is 0.1 to 1000 V, and the processing time is 5 to 300 minutes. This increases the sharpness of the edge, so that the cutting quality is enhanced.

In accordance with a second aspect of the present invention, a blade member is provided, in which, in a vacuum chamber, edges of a group of blades, of which the edge angle is 10 to 35 degrees and the height of burr is 0.1 to 10 μm, are subjected to plasma ion implantation of nitrogen plasma using a plasma ion implantation gun, and thereafter, the edges are subjected to ion beam treatment using a plasma ion gun, in which argon is used as a medium.

Accordingly, the ion beam treatment is performed in the same vacuum chamber subsequent to the plasma ion implantation, thereby working the edge efficiently. This allows the rigidity to be increased while leaving a hardened layer on the edge. Also, the entire edge line of the edge 11 is uniformly finished, so that the cutting quality is enhanced. The plasma ion implantation and the subsequent ion beam treatment may be repeated.

In accordance with a third aspect of the present invention, a blade member is provided in which edges of a group of blades are subjected to ion beam treatment using a plasma ion gun in a vacuum chamber, in which argon is used as a medium. The ion beam treatment is performed to a depth of 0.1 to 1.5 μm from the pointed end of the edge and to a depth of 0.1 to 1.5 μm in the direction of the thickness of the edge. This increases the sharpness of the edge 11, so that the cutting quality is enhanced.

In accordance with a fourth aspect of the present invention, a blade member is provided in which, in a vacuum chamber, a plurality of blade groups, each of which is formed by laminating a plurality of blades in a horizontal direction and passing a skewer through the blades, are caused to rotate while orbiting relative to each other. The edges are subjected to ion beam treatment using a plasma ion gun, in which argon is used as a medium. In this case, each blade group spins while orbiting about the plasma ion gun. Thus, ion beam treatment is evenly performed on the entire blade. Therefore, the sharpness of the entire edge is averagely increased, so that the cutting quality is enhanced.

In accordance with a fifth aspect of the present invention, an edge working apparatus for a blade member is provided that includes, in a vacuum chamber, a rotating body and a plurality of plasma ion guns arranged in parallel. The rotating body causes a plurality of blade groups, each of which is formed by laminating a plurality of blades and passing a skewer through the blades, to rotate while orbiting. The edges of each blade group are subjected to ion beam treatment using the plasma ion guns, in which argon is used as a medium. In this case, each blade group spins while orbiting about the plasma ion gun. Thus, ion beam treatment is evenly performed on the entire blade group.

In accordance with a sixth aspect of the present invention, a blade member is provided in which edges of a group of blades are subjected to ion plasma implantation of nitrogen plasma using a plasma ion implantation gun in a vacuum chamber, in which the pressure of the nitrogen is 0.5 to 5 Pa, a bias voltage applied to the blade group is 0.1 to 1000 V, a filament current is 100 to 200 A, and the processing time is 10 to 1000 minutes. In this case, the hardness of the edge is increased so that the rigidity is enhanced.

In accordance with a seventh aspect of the present invention, a blade member is provided in which, in a vacuum chamber, edges of a group of blades, of which the edge angle is 10 to 35 degrees and the height of burr is 0.1 to 10 μm, are subjected to ion beam treatment using a plasma ion gun, in which argon is used as a medium, and thereafter, the edges are subjected to plasma ion implantation of nitrogen plasma using a plasma ion implantation gun. In this case, the edge is worked efficiently by sequentially performing the ion beam treatment and the plasma ion implantation in the same vacuum chamber, so that a sufficient hardened layer is formed on the entire edge to improve the rigidity. The ion beam treatment and the subsequent plasma ion implantation may be repeated.

In accordance with an eighth aspect of the present invention, a blade member is provided in which edges of a group of blades are subjected to plasma ion implantation of nitrogen plasma using a plasma ion implantation gun in a vacuum chamber. The plasma ion implantation is performed to a depth of 0.1 to 1.5 μm from the pointed end of the edge and to a depth of 0.1 to 1.5 μm in the direction of the thickness of the edge. In this case, the hardness of the edge is increased so that the rigidity is enhanced.

In accordance with a ninth aspect of the present invention, a blade member is provided in which, in a vacuum chamber, a plurality of blade groups, each of which is formed by laminating a plurality of blades in a horizontal direction and passing a skewer through the blades, are caused to rotate while orbiting relative to each other. The edges are subjected to plasma ion implantation of nitrogen plasma using a plasma ion implantation gun. In this case, each blade group spins while orbiting about the plasma ion implantation gun. Thus, plasma ion implantation is evenly performed on the entire blade group. Therefore, the hardness of the entire edge is averagely increased, so that the rigidity is enhanced.

In accordance with a tenth aspect of the present invention, an edge working apparatus for a blade member is provided that includes, in a vacuum chamber, a rotating body, a plasma ion gun, and a plasma ion implantation gun. The rotating body causes a plurality of blade groups, each of which is formed by laminating a plurality of blades and passing a skewer through the blades, to rotate while orbiting. The working apparatus subjects the edges of each blade group to ion beam treatment using the plasma ion guns, in which argon is used as a medium, and subjects the edges of each blade group to plasma ion implantation of nitrogen plasma using the plasma ion implantation gun. In this case, each blade group spins while orbiting about the plasma ion gun and the plasma ion implantation gun. Thus, ion beam treatment is evenly performed on the entire blade group. Also, the plasma ion implantation is evenly performed on the edges of each blade group. Further, the ion beam treatment and the plasma ion implantation are performed in the same vacuum chamber. Thus, these processes can be subsequently performed, so that the edge can be worked efficiently. For example, one of the ion beam treatment and the plasma ion implantation may be performed after the other. Also, the plasma ion implantation and the subsequent ion beam treatment may be repeated. Alternatively, the ion beam treatment and the subsequent plasma ion implantation may be repeated.

DETAILED DESCRIPTION OF THE INVENTION

One embodiment of the present invention will now be described with reference to the drawings.

Figure 1:
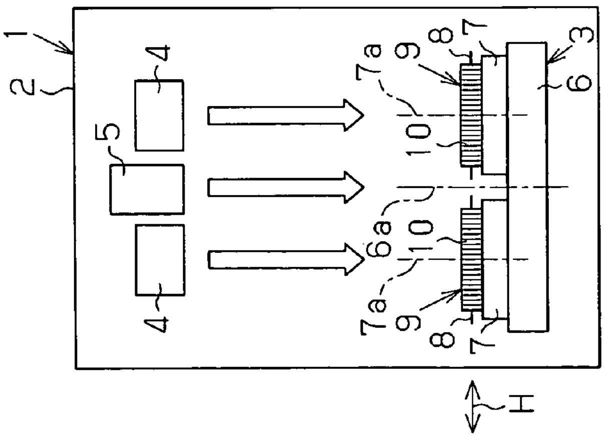
FIG. 1 is a diagram schematically showing a working apparatus for the edge of a blade member according to one embodiment.
Figure 4A:
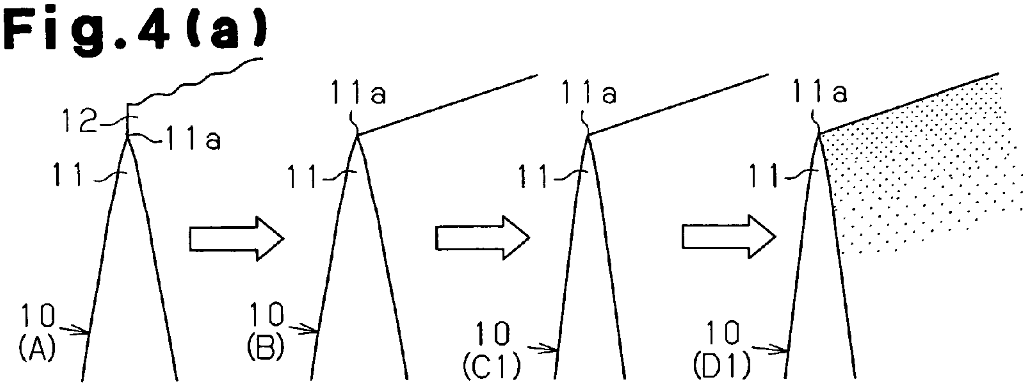
FIGS. 4(*a*), 4(*b*), 4(*c*), and 4(*d*) are explanatory diagrams each schematically showing a working procedure of the edge of a blade.
Figure 4B:
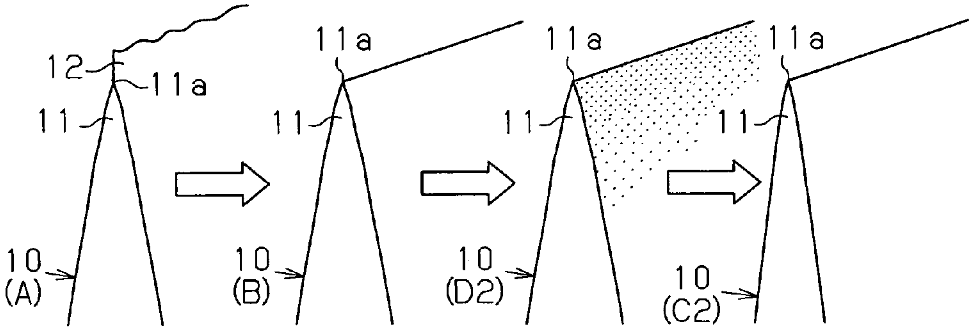
Figure 4C:
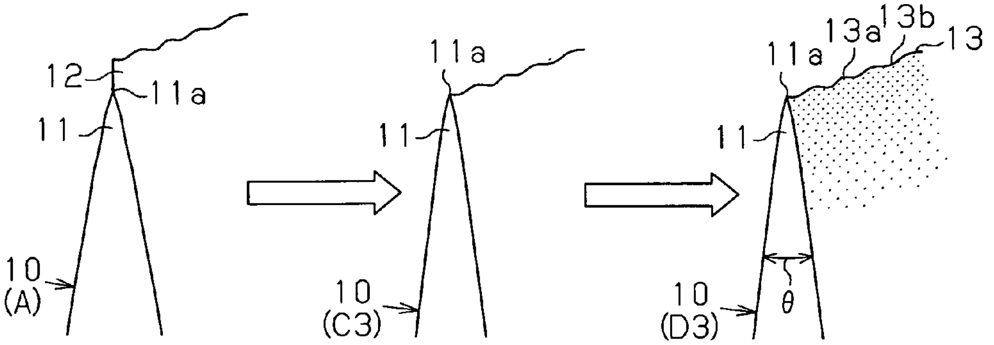
Figure 4D:
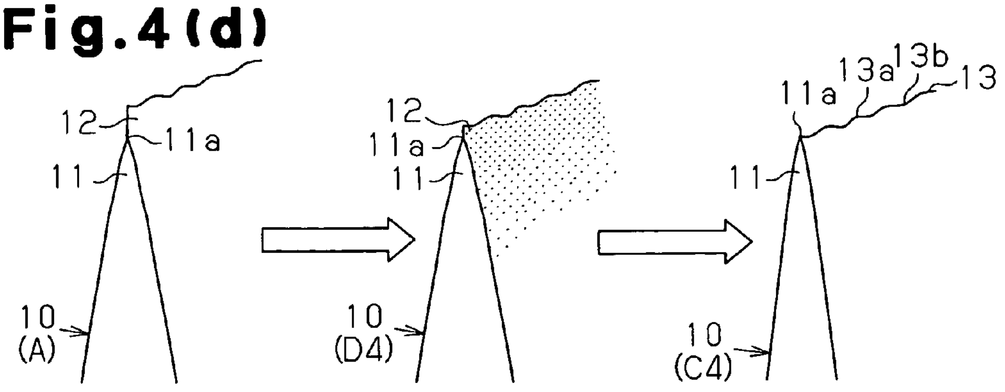

FIG. 1 schematically shows a working apparatus 1, which has a vacuum chamber 2. A blade mounting stage 3 is provided in a lower portion of the vacuum chamber 2. In an upper portion of the vacuum chamber 2, plasma ion guns 4 and a plasma ion implantation gun 5 are arranged in parallel. Each plasma ion gun 4 performs ion beam treatment using argon as medium, while the plasma ion implantation gun 5 performs plasma ion implantation using nitrogen plasma. An orbit base 6 is supported by the blade mounting stage 3. The orbit base 6 functions as a rotating body that rotates about an orbital axis 6*a*. Spinning bases 7 are supported on the orbit base 6. Each spinning base 7 functions as a rotating body that spins about a rotational axis 7*a*. A group of blades 9 is attached to each spinning base 7, so as to be located about the orbital axis 6*a*. The blade group 9 includes a plurality of blade members, which are blades, 10. A skewer 8 is passed through the blades 10 such that the blades 10 laminated along a horizontal direction H. The direction in which the blades 10 are laminated is perpendicular to the orbital axis 6*a* and the rotational axes 7*a*.

When the orbit base 6 and the spinning bases 7 rotate, each blade group 9 spins and orbits. In this state, each blade group 9 is subjected to ion beam treatment and plasma ion implantation in accordance with working procedures shown in, for example, FIGS. 4(*a*), (*b*), (*c*), and (*d*). The orbit base 6 and the spinning bases 7 do not need to rotate in the same direction (forward rotation), but may be rotated forward and reverse alternately.

A plurality of blades 10 (10A) are coupled along the longitudinal direction to form a belt-like blade material in a first working procedure shown in FIG. 4(*a*). In the blade material, a burr 12, which has a height from 0.1 to 10 μm, is removed by a razor strop, so that the edge 11 is made very slightly dull. Then, the belt like blade material is cut into the blades 10 (10B). Thereafter, the edge 11 of each blade 10 (10C1) is subjected to an ion beam treatment, so as to be sharpened. Further, the edge 11 of each blade 10 (10D1) is subjected to plasma ion implantation, so as to be hardened. The thickness of the belt-like blade material is preferably 0.05 mm or more.

In a second working procedure shown in FIG. 4(*b*), a burr 12, which has a height from 0.1 to 10 μm, is removed by a razor strop from the edge 11 of the connected blades 10 (10A) in a belt-like blade material. The edges 11 are thus made very slightly dull. Then, the belt like blade material is cut into the blades 10 (10B). Thereafter, the edge 11 of each blade 10 (10D2) is subjected to a plasma ion implantation, so as to be hardened. Further, the edge 11 of each blade 10 (10C2) is subjected to ion beam treatment, so as to be sharpened.

In a third working procedure shown in FIG. 4(*c*), a similar belt-like blade material having coupled blades 10 (10A) is cut into blades 10 without removing a burr 12 on the edge 11 with a razor strop. Thereafter, the edge 11 of each blade 10 (10C3) is subjected to an ion beam treatment, so as to be sharpened, and the burr 12 is removed. Further, the edge 11 of each blade 10 (10D3) is subjected to plasma ion implantation, so as to be hardened.

In a fourth working procedure shown in FIG. 4(*d*), a similar belt-like blade material having coupled blades 10 (10A) is cut into blades 10 without removing a burr 12 on the edge 11 with a razor strop. Thereafter, the edge 11 of each blade 10 (10D4) is subjected to a plasma ion implantation, so as to be hardened, while leaving a burr 12 having a height that is half the height of a burr that is not stropped. Further, the edge 11 of each blade 10 (10C4) is subjected to ion beam treatment, so as to be sharpened, and the burr 12 is removed.

In the edge 11 that is worked though the working procedure of FIG. 4(*c*) or the working procedure of FIG. 4(*d*), alternate crests 13*a* and troughs 13*b* form a wavy edge line 13. The height difference between the crests 13*a* and the troughs 13*b* is 0.1 to 1 μm. In each 10 μm section of the edge 11, five to thirty crest 13*a* or troughs 13*b* are formed. The edge angle θ of the edge 11 is preferably 20 degrees or less particularly when the edge 11 is not stropped, and more preferably 16 degrees or less. After the ion beam treatment or the plasma ion implantation, the vacuum chamber 2 is cleaned.

Figure 2:
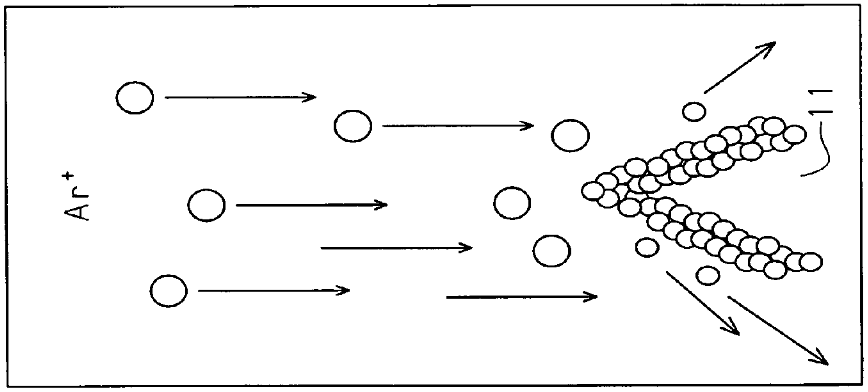
FIG. 2 is an explanatory diagram showing the principles of ion beam treatment.
Figure 5:
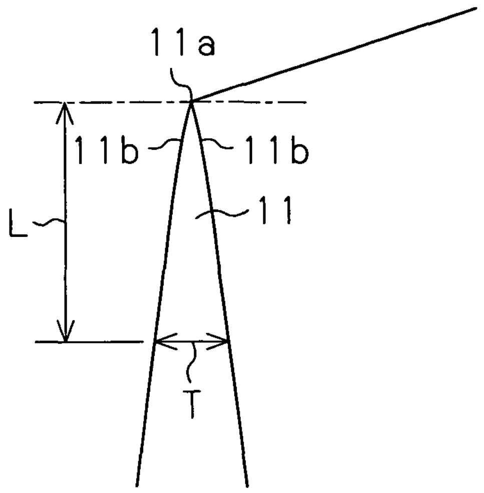
FIG. 5 is an explanatory diagram schematically showing the thickness of the edge of the blade according to the present invention at a position spaced from the pointed end by a predetermined distance.

As shown in FIG. 2, which illustrates the principles of the ion beam treatment, argon gas is introduced into each plasma ion gun 4, and enters a plasma state, where the argon gas is ionized into argon ions ($Ar^+$) and electrons $e^-$. Argon ions are extracted by a magnetic filed (not shown) and applied to the edge. The argon ions work the edge by flicking off metal from the edge, thereby sharpening the edge. In the ion beam treatment, the ionization voltage is set to 2 to 3 kV. The bias voltage to the blade groups 9 is set to 0.1 to 1000 V. The argon pressure is 0.1 to 1 Pa, and the processing time is set to 5 to 300 minutes. The ion beam treatment is performed over a distance of 1 to 30 µm along the two edge surfaces 11*b*, to a depth of 0.1 to 1.5 µm from the pointed end 11*a* of the edge 11, and to a depth of 0.1 to 1.5 µm along the thickness of the edge 11, as shown in FIG. 5. The temperature of the edge 11 is increased to 150° C. or higher.

Figure 3A:
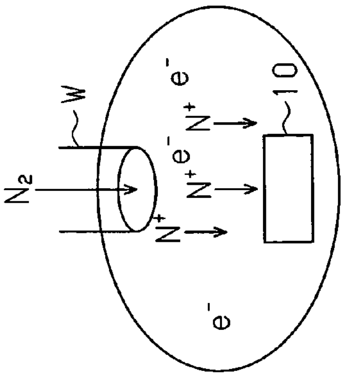
FIGS. 3(*a*) and 3(*b*) are explanatory diagrams showing the principles of plasma ion implantation.
Figure 3B:
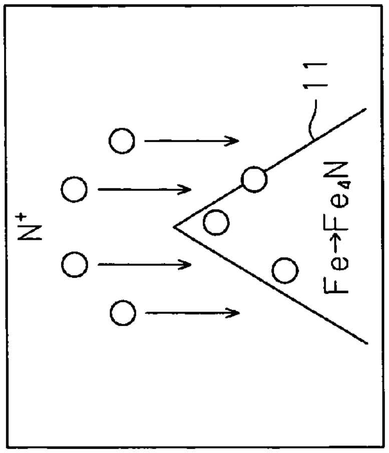

FIGS. 3(*a*) and 3(*b*) illustrate the principles of the plasma ion implantation. When a current is applied to a tungsten filament W while nitrogen gas is being injected into the vacuum chamber 2, the nitrogen gas enters a plasma state. In this state, negative bias is applied to the blade to cause nitrogen plasma ($N^+$) to hit and be implanted into the edge. This generates $Fe_4N$, thereby hardening the edge. In the plasma ion implantation, the filament current is set to 100 to 200 A, the discharge current is set to 100 to 300 A, the bias voltage to the blade groups 9 is set to 0.1 to 1000 V, the nitrogen pressure is 0.5 to 5 Pa, and the processing time is set to 10 to 1000 minutes. The discharge current refers to a current applied between the ion gun and the blade group to cause nitrogen plasma ($N^+$) to hit and be implanted into the edge.

The plasma ion implantation is performed over a distance of 0.1 to 3 mm along the two edge surfaces 11*b* in the entire length of the edge 11, to a depth of 0.1 to 1.5 µm from the pointed end 11*a* of the edge 11, and to a depth of 0.1 to 1.5 µm along the thickness of the edge 11 as shown in FIG. 5. The temperature of the edge 11 is increased to 200° C. or higher, and the hardness of the edge 11 becomes 1200 to 2000 Hv.

In the edge 11, which has been worked through any of the procedure of FIGS. 4(*a*), 4(*b*), 4(*c*), 4(*d*) as described above, the distance (depth) from the pointed end 11*a*, which is formed by the intersecting edge surfaces 11*b*, is expressed by L, and the thickness between the edge surfaces 11*b* at the distance L is expressed by T. The values of the thickness T at the distance L are shown in table 1.

TABLE 1

| Blade thickness of ideal shape | | |
|---|---|---|
| Distance L from the pointed end | Thickness T (µm) | |
| (µm) | Tmin | Tmax |
| 0.5 | 0.4 | 0.5 |
| 1 | 0.65 | 0.85 |
| 2 | 1.1 | 1.4 |
| 4 | 2.1 | 2.5 |
| 10 | 4.0 | 4.5 |
| 20 | 6.5 | 7.5 |
| 30 | 9.0 | 11.0 |
| 50 | 14.0 | 16.5 |

That is, the ideal shape of the edge 11 is achieved when, at each position of the distance L from the pointed end 11*a* of 0.5 µm, 1 µm, 2 µm, 4 µm, 10 µm, 20 µm, 30 µm, 50 µm, the thickness between the edge surfaces 11*b* of the blade 10 is between the maximum thickness Tmax (0.5 µm, 0.85 µm, 1.4 µm, 2.5 µm, 4.5 µm, 7.5 µm, 11.0 µm, 16.5 µm) and the minimum thickness Tmin (0.4 µm, 0.65 µm, 1.1 µm, 2.1 µm, 4.0 µm, 6.5 µm, 9.0 µm, 14.0 µm).

Up to 4 µm of the distance L from the pointed end 11*a*, the edge 11 is relatively thick and the durability is increased. In a region where the distance L from the pointed end 11*a* is 4 µm or greater, the edge 11 is relatively thin, so that the cut resistance is reduced.

The edge 11 is subjected to film forming process to form a film of DLC (Diamond Like Carbon) or TiCrAlN to improve the strength of the edge 11. Also, the pointed end 11*a* of the edge 11 is rounded with a radius of curvature of 20 to 50 nm, thereby preventing the edge 11 from biting into skin. The edge 11 is also coated with fluorocarbon resin.

Figure 6:
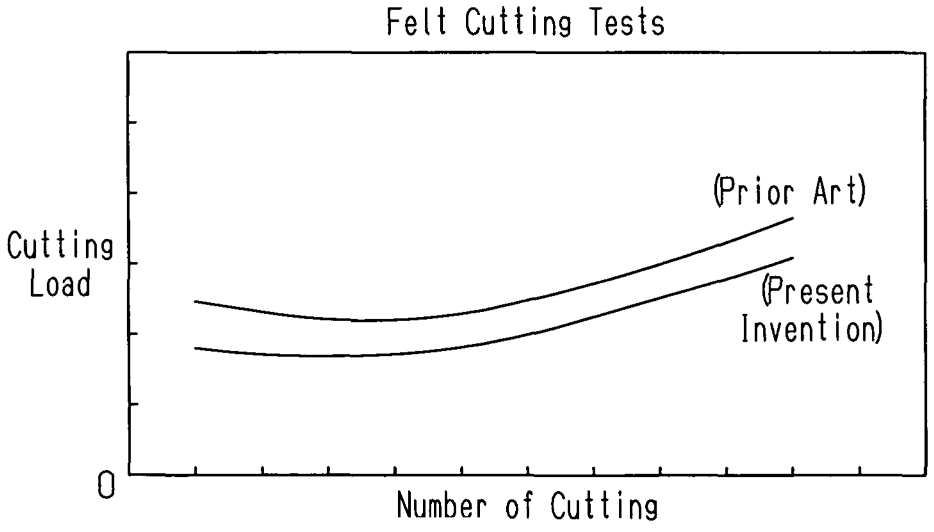
FIG. 6 is a graph showing the results of felt cutting tests performed on the blade of the present invention and a conventional blade.

In the felt cutting test shown in FIG. 6, the blade 10 of the present invention, which had been subjected to the above described additional treatment, and a prior art blade that had been subjected to the same additional treatment after being stropped, were tested for felt cutting. Every time cutting is performed, the cutting load was measured and the average value was calculated. As a result, the cutting load of the blade 10 according to the present invention was less than that of the conventional blade, and the cutting quality and the related durability of the blade 10 according to the present invention were improved.

In the organoleptic test shown in Table 2, the blade 10 of the present invention, which had been subjected to the above described additional treatment, and a prior art blade that had been subjected to the same additional treatment after being stropped, were tested for shaving feel five times by thirty triers under the same conditions. Each time, the cutting quality was evaluated on a scale of one to five, and the average of the evaluation by the thirty triers was calculated. As a result, the points of the blade 10 of the present invention were higher than those of the conventional blade, and the cutting quality of the blade 10 of the present invention were improved.

TABLE 2

| Organoleptic Test | | |
|---|---|---|
| Number of shavings | Present Invention | Conventional |
| 1st time | 4.2 | 3.7 |
| 2nd time | 4.2 | 3.9 |
| 3rd time | 4.0 | 3.8 |
| 4th time | 4.0 | 3.8 |
| 5th time | 3.9 | 3.6 |

The invention claimed is:

1. A blade member comprising a plurality of blade groups, the blade groups each containing a laminate of a plurality of blades arranged in a horizontal direction;

edges of blades of the blade groups having an evenly sharpened and hardened layer along an entire edge line of the edges to the depth of 0.1 to 1.5 µm from a pointed end of the edge and to a depth of 0.1 to 1.5 µm in a thickness direction of the edge by ion beam treatment and plasma ion implantation;

the edges of the blades of the blade groups prior to the ion beam treatment and plasma ion implantation initially having an edge angle of 10 to 35 degrees and a burr height of 0.1 to 10 µm, and while the plurality of blade groups rotate and orbit relative to each other, the edges of the group of blades are:

subjected to ion beam treatment using a plasma ion gun, in which argon is used as a medium, and subjected to ion plasma implantation of nitrogen plasma using a plasma ion implantation gun in a vacuum chamber, in which the pressure of the nitrogen is 0.5 to 5 Pa, a bias voltage applied to the blade group is 0.1 to 1000 V, a filament current is 100 to 200 A, and the processing time is 10 to 1000 minutes, resulting in the edges of the blades of the blade groups having the evenly sharpened and hardened layer along the entire edge line of the edges to the depth of 0.1 to 1.5 μm from the pointed end of the edge and to the depth of 0.1 to 1.5 μm in the thickness direction of the edge.

2. The blade member according to claim 1, further comprising a skewer passing through the laminate of the plurality of blades, and a base having an orbital axis, wherein the plurality of blade groups are rotatably mounted on the base and about the orbital axis.

3. An edge working method for a blade member, the method comprising, providing blade groups of blades with edges having an edge angle of 10 to 35degrees and a burr height of 0.1 to 10 μm;

in a vacuum chamber, rotating a plurality of the blade groups, each of which is formed by laminating a plurality of the blades and passing a skewer through the blades, and while orbiting the rotating the plurality of the blade groups about each other, forming an evenly sharpened and hardened layer along an entire edge line of the edges to the depth of 0.1 to 1.5 μm from a pointed end of the edge and to a depth of 0.1 to 1.5 μm in a thickness direction of the edge by:

subjecting the edges of each blade group to ion beam treatment using the plasma ion guns, in which argon is used as a medium, and subjecting the edges of each blade group to ion plasma implantation of nitrogen plasma using a plasma ion implantation gun, in which the pressure of the nitrogen is 0.5 to 5 Pa, a bias voltage applied to the blade group is 0.1 to 1000V, a filament current is 100 to 200 A, and the processing time is 10 to 1000 minutes.

4. The edge working method for a blade member according to claim 3, further providing a base having an orbital axis, wherein the plurality of blade groups are arranged on the base about the orbital axis, the plurality of blade groups are rotatably mounted on the base and about the orbital axis, and the blade groups rotate while orbiting about the orbital access relative to each other.

* * * * *